United States Patent [19]

Kempter et al.

[11] 4,134,932

[45] Jan. 16, 1979

[54] SURFACE-COATING BINDERS FOR CATHODIC ELECTROCOATING

[75] Inventors: Fritz E. Kempter, Mannheim; Heinrich Hartmann, Limburgerhof; Erich Gulbins, Heidelberg-Neuenheim, all of Fed. Rep. of Germany

[73] Assignee: BASF Aktiengesellschaft, Ludwigshafen, Fed. Rep. of Germany

[21] Appl. No.: 884,909

[22] Filed: Mar. 9, 1978

[30] Foreign Application Priority Data

Mar. 16, 1977 [DE] Fed. Rep. of Germany ....... 2711425

[51] Int. Cl.$^2$ .............................................. C08L 63/00
[52] U.S. Cl. ................. 260/831; 204/181 R; 260/830 P; 260/830 S
[58] Field of Search ............................ 260/831, 830 P

[56] References Cited

U.S. PATENT DOCUMENTS

| 3,462,237 | 8/1969 | Sellet | 260/831 |
| 3,790,606 | 2/1974 | Sellet | 260/831 |
| 3,994,989 | 11/1976 | Kempter | 260/830 TW |
| 4,014,955 | 5/1977 | Renner | 260/831 |
| 4,086,292 | 4/1978 | Kempter | 260/831 |

FOREIGN PATENT DOCUMENTS 2357075 5/1975 Fed. Rep. of Germany.
1457932 12/1976 United Kingdom.

*Primary Examiner*—Paul Lieberman
*Attorney, Agent, or Firm*—Keil, Thompson & Shurtleff

[57] ABSTRACT

Surface-coating binders for cathodic electrocoating which comprise a protonized heat-curable reaction product (A), substantially free from epoxide groups, of (a) one or more Mannich bases, prepared from (a$_1$) one or more polyhydric condensed phenols which may or may not contain ether groups.

(a$_2$) one or more secondary amines which contain one or more hydroxyalkyl groups, with or without one or more secondary amines which do not contain such groups, and (a$_3$) formaldehyde or a formaldehyde donor, with (b) one or more epoxy resins, which binder also contains from 1 to 40% by weight, based on the total of (A) + (B), of a water-insoluble non-ionic resin (B), free from epoxide groups and containing urethane groups, which resin has been obtained by reacting a partially blocked diisocyanate or higher polyisocyanate with a reaction product of a polyepoxide and one or more low molecular weight compounds containing SH and/or OH groups.

These surface-coating binders are especially used for the cathodic electrocoating of metal articles.

6 Claims, No Drawings

SURFACE-COATING BINDERS FOR CATHODIC ELECTROCOATING

The present invention relates to surface-coating binders for cathodic electrocoating, which binders contain a protonized heat-curable reaction product of a Mannich base and an epoxy resin, together with a water-insoluble non-ionic resin containing urethane groups.

Binder systems suitable for cationic electrocoating finishes and containing urethane and amine groups, with or without hydroxyl groups, have been disclosed and are described, for example, in German Laid-Open Applications DOS Nos. 2,057,799, 1,265,361, 2,252,536 and 2,363,074 and in British Pat. No. 1,302,328. These finishes give good results in respect of corrosion protection, throwing power or stability of the bath, but are not entirely satisfactory if the totality of binder properties is considered. A substantial shortcoming of the conventional systems is, inter alia, that they cannot be processed in the pH range of from 7 to 9 used for anodic electrocoating. A further disadvantage is that the desired pH range is in some cases unsuitable for the stated crosslinking reactions.

German Laid-Open Applications DOS Nos. 2,320,301, 2,357,075 and 2,419,179 disclose binders for cationic electrocoating finishes which inter alia exhibit vey good corrosion protection and which can be deposited at an alkaline pH of above 7. These binders are reaction products of Mannich bases, obtained from polyphenols, secondary amines and formaldehyde, with epoxy resins. Essentially, the o-diethanolaminomethylenephenol group or the o-alkylethanolaminomethylenephenol group of the Mannich base is responsible for the crosslinking on baking the finishes. However, these binders require improvement in respect of certain properties.

It is an object of the present invention to provide binder compositions for cationic electrocoating finishes which substantially meet the requirements in respect of the essential binder properties. More particularly, it is an object of the invention to provide binders which eliminate little or no amine on baking. The pH of the surfacecoating baths should be from 7 to 9 because, if the product is to be usable in the conventionally available processing installations, the surface-coating bath must have a higher pH than 7. In addition, the binder should more closely meet the requirements in respect of avoiding redispersibility of freshly deposited coats in the electrocoating bath and in respect of resistance to water drips and have a lower deposition equivalent.

We have found that this object is achieved by providing surface-coating binders for the cathodic electrocoating of electrically conductive surfaces, which binders comprise a protonized heat-curable reaction product (A), substantially free from epoxide groups, of
(a) one or more Mannich bases, prepared from
  ($a_1$) one or more polyhydric condensed phenols which may or may not contain ether groups,
  ($a_2$) one or more secondary amines which contain one or more hydroxyalkyl groups, with or without one or more secondary amines which do not contain such groups, and
  ($a_3$) formaldehyde or a formaldehyde donor, with
(b) one or more epoxy resins,
which binder also contains from 1 to 40% by weight, based on the total of (A) + (B), of a water-insoluble non-ionic resin (B), free from epoxide groups and containing urethane groups, which resin has been obtained by reacting a partially blocked diisocyanate or higher polyisocyanate with a reaction product of a polyepoxide and one or more low molecular weight compounds containing SH and/or OH groups.

In an advantageous embodiment of the surface-coating binders according to the invention, the non-ionic resin (B) which is free from epoxide groups and contains urethane groups is a reaction product of a partially blocked diisocyanate or polyisocyanate, which contains not more than one free isocyanate group per molecule, with a reaction product, substantially free from epoxide groups, of a polyepoxide with one or more compounds of the general formula HXR, where X is sulfur or oxygen and R is alkyl, oxaalkyl, hydroxyalkyl or hydroxyoxaalkyl of 2 to 10 carbon atoms, aryl or alkylaryl.

Furthermore, preferred surface-coating binders according to the invention are those where the polyepoxide used to prepare component (B) is a glycidyl ether based on bisphenol A, or a glycidyl ether of a polyhydric alcohol, and/or the compound of the general formula HXR is a mercaptan of the formula HSR, where R is alkyl of 1 to 12 carbon atoms or is —CH$_2$—CH$_2$—OH or

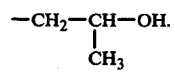

Preferably, the component (B) is prepared using aromatic diisocyanates partially blocked with aliphatic or cycloaliphatic, especially secondary or tertiary, alcohols.

The surface-coating binders according to the invention are distinguished by the fact that they can be cathodically deposited from a surface-coating bath having a pH greater than 7, that they give improved throwing power, that redispersion of freshly deposited coats in the electrocoating bath is substantially avoided, that on baking only little amine is eliminated and that the water drip resistance of the freshly deposited coats is substantially improved.

The following details may be noted in respect of the constituents and preparation of the electrocoating binders according to the invention.

(A) The protonized heat-curable reaction product (A) which is substantially free from epoxide groups is obtained by reacting one or more Mannich base (a) with one or more epoxy resins (b).

(a) The Mannich bases (a) are reaction products of
  ($a_1$) a polyhydric phenol which may or may not contain one or more ether groups,
  ($a_2$) a secondary amine and
  ($a_3$) formaldehyde.
  ($a_1$) Suitable polyhydric condensed phenols free from ether groups are those which contain at least two aromatic rings; particularly suitable phenols are those of the general formula

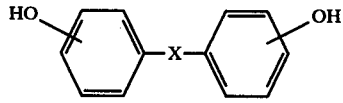

where the hydroxyl groups are in the ortho-position or paraposition to X and X is a straight-chain or branched, dihydric aliphatic radial or 1 to 3 carbon atoms or is SO$_2$, SO, O or

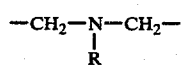

(where R is alkyl of 1 to 6 carbon atoms); bisphenol A is preferred. Low molecular weight reaction products of phenols with formaldehyde, i.e., novolacs, may also be employed. Such products are described in, for example, German Laid-Open Applications DOS Nos. 2,320,301 and 2,367,075.

Mixed with the above condensed phenols which are free from ether groups, or in place of these phenols, there may also be used other condensed phenols which contain one more more phenolic hydroxyl groups and in addition contain one or more ether groups in the molecule. These products suitably have the general formula

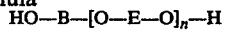

or

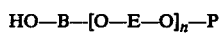

where B is

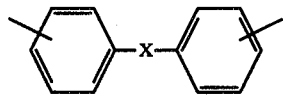

and X has the above meaning, E is a hydroxyl-containing radical obtained by adduct formation of an epoxy compound with a phenolic hydroxyl group, P is phenyl or alkylphenyl, and n is an integer from 1 to 3, preferred epoxy compounds used for E being epoxy resins, e.g., the diglycidyl ethers of bisphenol A, pentaerythritol, glycerol, trimethylolpropane, glycol, glycol ethers and other polyhydric, preferably dihydric, trihydric and tetrahydric, alcohols. Such products are described, for example, in German Laid-Open Application DOS No. 2,419,179.

Other compounds containing epoxide groups which may be used for E are nitrogen-containing diepoxides as described in U.S. Pat. No. 3,365,471, epoxy resins obtained from 1,1-methylene-bis(5-substituted hydantoin) (U.S. Pat. No. 3,391,097), diepoxides from bis-imides (U.S. Pat. No. 3,450,711), epoxidized aminomethyl-diphenyl oxides (U.S. Pat. No. 3,312,664), epoxidized oils, epoxidized polybutadiene oils, heterocyclic N,N'-diglycidyl compounds (U.S. Pat. No. 3,503,979), amino-epoxyphosphonates (British Pat. No. 1,172,916), 1,3,5-triglycidyl isocyanurates and other materials containing epoxide groups and well known in the art, e.g., dicyclopentadiene dioxide and limonene dioxide.

The products in general have molecular weights of from 650 to 1,300 and epoxy values of from 0.004 to 0.01 and may be prepared, for example, at from 170° to 180° C., or at lower temperatures when using catalysts for the reaction.

If condensed phenols containing ether groups are to be used alone, it is advantageous to employ those based on triglycidyl ethers or tetraglycidyl ethers, i.e., products with at least 3 phenolic OH groups per molecule.

($a_2$) Examples of suitable secondary amines ($a_2$) which contain at least one hydroxyalkyl group are alkylethanolamines or alkylisopropanolamines, where alkyl is of 1 to 6 carbon atoms. However, dialkanolamines derived from alcohols of 2 to 6 carbon atoms, especially diethanolamine, and mixtures of these alkanolamines or dialkanolamines with alkylalkanolamines are preferred.

The secondary amines ($a_2$) used for the Mannich bases (a) and present as diethanolaminomethyl groups and alkylethanolaminomethyl groups are of essential importance in determining the degree of dispersibility of the binder in the desired pH range of from 6.0 to 10.2 and in determining the crosslinking of the system.

Suitable secondary alkylamines which may or may not be used together with the amines containing hydroxylalkyl groups for the preparation of the Mannich bases (a) are those of the general formula

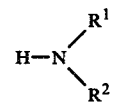

where $R^1$ and $R^2$ are identical or different and each is a straightchain or branched aliphatic radical of 2 to 10 carbon atoms, which may or may not contain alkoxy groups. Examples of suitable secondary amines of this type are di-n-butylamine, di-n-propylamine, diisopropylamine, di-n-pentylamine, di-n-hexylamine, di-n-octylamine, di-2-ethylhexylamine and di-2-alkoxyethylamines, e.g., di-2-methoxy-, di-2-ethoxy- or di-2-butoxy-ethylamine, as well as those where $R^1$ and $R^2$ are linked to form a ring, e.g., morpholine or piperidine.

Amongst these secondary amines which may or may not be used, di-n-butylamine, di-n-hexylamine and di-n-octylamine, di-2-ethylhexylamine and di-2-alkoxyethylamines, and mixtures of these, are preferred. The mode of action of the secondary amines ($a_2$) is essentially that they influence the stability characteristics of the binders and contribute to the levelling and "internal plasticization" of the coats produced from the binders.

($a_3$) The formaldehyde or formaldehyde donor used is preferably a solution of formaldehyde in an alcohol, e.g., butanol, or paraformaldehyde, or a mixture of these.

The Mannich bases (a) are prepared in accordance with the conventional methods described in the literature, for example in Houben-Weyl, Methoden der organischen Chemie, volume XI/I, page 731 (1957).

The ratios in which the starting materials are used depend on the particular properties desired.

To prepare the Mannich base (a), the ratio of the starting materials ($a_1$) and ($a_2$) is advantageously chosen to provide from about 0.3 to 2.0, preferably from 0.5 to 1.5, moles of component ($a_2$) per phenolic hydroxyl group of component ($a_1$).

The amount of ($a_3$) to be employed for the preparation of the Mannich base (a) is as a rule at least 1 mole per mole of ($a_2$), but may be greater and is only limited by the acceptable residual formaldehyde content of the binder.

The properties of the electrocoating bath and of the coating obtained can be varied at will by varying the ratios of the secondary amines. The dispersibility of the binder, the reactivity, the levelling, the crosslinking, the elasticity and the degree of corrosion protection can be varied by varying the ratio of diethanolamine or alkylethanolamine to di-n-butylamine, di-n-hexylamine, di-2-ethylhexylamine, di-n-octylamine and di-2-alkoxyethylamine.

(B) Suitable water-insoluble, non-ionic resins (B) which are free from epoxide groups and contain urethane groups, and which are present in the binder according to the invention in an amount of from 1 to 40, preferably from 5 to 20, % by weight based on the total amount of (A) + (B), are reaction products of partially blocked diisocyanates or higher polyisocyanates with reaction products of a polyepoxide and one or more low molecular weight compounds containing SH and/or OH groups which are hereinafter defined. Resins (B) which have mean molecular weights of from 750 to 1,500 are preferred.

Suitable partially blocked polyisocyanate compounds are those which contain one or more blocked isocyanate groups and one or more free isocyanate groups in the molecule.

Preferred blocking agents are alcohols of 1 to 18 carbon atoms, which may be straight-chain, branched or cyclic, e.g., ethylhexanol, heptan-4-ol, tert.-butanol, furfuryl alcohol, cyclohexanol, alkylglycols and oligomeric polyglycols. Secondary and tertiary alcohols, e.g., cyclohexanol and tert.-butanol, are preferred. However, other conventional blocking agents, e.g., oximes, lactams and phenols may also be employed.

The blocking agents are reacted with polyisocyanates which contain at least two isocyanate groups per molecule in the conventional manner at below 100° C., if necessary in the presence of an inert solvent.

Examples of suitable polyisocyanates are aromatic diisocyanates, e.g., m- and p-phenylene diisocyanate, 4,4'-diphenylmethane diisocyanate, 2,4- and 2,6-tolylene diisocyanate, and m- and p-xylylene diisocyanate, which are preferred, and aliphatic and alicyclic diisocyanates, e.g., hexamethylene diisocyanate and isophoron diisocyanate. Dimerized and trimerized diisocyanates, e.g., ®Desmodur L from Bayer, may also be employed. If desired, the reaction can be carried out with appropriate catalysts, e.g., dibutyl-tin dilaurate.

Suitable solvents are glycol esters and ethers, ketones and the like.

With regard to the reaction products of a polyepoxide and one or more low molecular weight compounds, containing SH or OH groups, which are to be reacted with the partially blocked diisocyanates or polyisocyanates in order to prepare component (B), the following may be noted in respect of the starting components:

Preferred epoxy resins are polyepoxide compounds with from 2 to 3 epoxide groups in the molecule, e.g., reaction products of polyhydric phenols, especially those of the formula

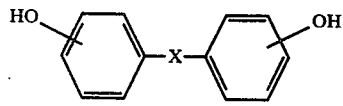

referred to above, with epichlorohydrin, but also the reaction products, referred to above, of polyhydric alcohols, e.g., pentaerythritol, trimethylolpropane or glycerol, with epichlorohydrin, as well as reaction products, containing epoxide groups, of epoxy resins with secondary amines or with hydroxyl-containing glycol ethers, and epoxy resins which contain heteroatoms, e.g., sulfur, in the molecule.

Other suitable compounds containing epoxy groups are nitrogen-containing diepoxides are described in U.S. Pat. No. 3,365,471, epoxy resins obtained from 1,1-methylene-bis-(5-substituted hydantoin) as described in U.S. Pat. No. 3,391,097, diepoxides obtained from bisimides as described in U.S. Pat. No. 3,450,711, 1 epoxidized aminomethyl-diphenyl oxides as described in U.S. Pat. No. 3,312,664, epoxidized oils, e.g., epoxidized polybutadiene oils, heterocyclic N,N'-diglycidyl compounds as described in U.S. Pat. No. 3,503,979, aminoepoxyphosphates as described in British Pat. No. 1,172,916 and 1,3,5-triglycidyl isocyanurate.

The epoxy resins in general contain hydroxyl groups bound to aliphatic carbon, especially if condensaton to products of higher molecular weight has occurred during the reaction with the acidic compounds, e.g., mercaptans.

Suitable low molecular weight compounds containing SH or OH groups are compounds of the general formula HXR, where X is sulfur or oxygen and R is alkyl, oxaalkyl, hydroxyalkyl or hydroxyoxaalkyl of 2 to 10 carbon atoms or is aryl or alkylphenyl. Preferred examples of suitable compounds of the general formula HXR are phenols, e.g., phenol and alkylphenols, alkylmercaptans of 1 to 12, preferably of 2 to 12, carbon atoms, e.g., dodecylmercaptan, and especially hydroxyalkylmercaptans, e.g., HS—CH$_2$—CH$_2$—OH and

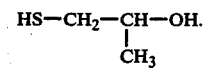

Further suitable compounds are mono- or polyhydric alcohols as well as glycol alcohols and oligomeric glycol alcohols, if the reaction is carried out in the presence of a suitable catalyst, e.g., boron trifluoride etherate. In principle, any reaction which ensures ring opening of the epoxide under simple conditions is suitable. The reactions between the epoxy compound and the compounds of the formula HXR are in general carried out at from 80° C. to 180° C. However, they can also be carried out following the reaction of the epoxy resins, containing free OH groups, with the partially blocked polyisocyanate, in which case the reaction proceeds to the required degree of completion at low temperatures.

If epoxy resins based on polyhydric aliphatic alcohols, e.g., pentaerythritol, are used, the isocyanate preferentially attacks the free primary alcohol group; the secondary alcohol group which has been formed from the epoxide ring reacts less readily.

Another possible way of introducing primary OH groups into an epoxy resin is a reaction with, for example, mercaptoethanol. The reaction of the partially blocked isocyanate with the primary OH groups is highly desirable, because the resulting bond is more resistant to further reactions than is the urethane group of the blocking agent, e.g., of cyclohexanol, heptan-4-ol or tert.-butanol.

It is advantageous that the components (B) of the binders should have softening points below 130°, preferably of from 40° to 100° C.

The blocked isocyanate groups of component (B), when present in a mixture with the Mannich bases of component (A), are stable to amino groups and especially to hydroxyl groups at room temperature and even at slightly elevated temperature; they only react at above 100° C. At the baking temperature, the replacement of the blocking agent by amines which are split off during the curing of (A) should take place rapidly and substantially completely, thereby substantially reducing, or even eliminating, the intrinsic odor nuisance from dialkylamines and/or alkylalkanolamines.

For the reaction with the partially blocked polyisocyanates, the ratio of component (A) to component (B) is preferably selected to provide, per mole of basic nitrogen of the total binder, from 0.01 to 1.0, preferably from 0.05 to 0.5, mole of urethane groups, counting both the urethane bond between component (B) and the polyisocyanate and the urethane bond between the blocking agent and the polyisocyanate. For example, in the case of a binder containing from 1.5 to 4.5% of nitrogen modification with from 0.5 to 15%, preferably from 2 to 12, of toluylene diisocyanate, based on solids content of (A) and (B), suffices substantially to reduce amine elimination during baking; this applies to mixtures which contain from 1 to 40%, preferably from 5 to 30%, of component (B), based on (A) + (B). It may be noted that the ratio of the blocked urethane groups of component (B) to the OH groups of component (A) is immaterial.

Partially blocked isocyanate groups of component (B) can also be introduced into the binder, starting from amino or imino groups, via urea groups, and this may at times be desirable.

Advantageously, (B) is combined with (A) at room temperature or an elevated temperature, e.g., the temperature at which component (A) is prepared, by stirring one into the other, using conventional mixing equipment.

It is essential that the product obtained from components (A) and (B) should be substantially free from epoxide groups; this ensures that the binder combinations according to the invention can be processed, without technical difficulties, at a constant pH of from 6.5 to 10, preferably from 7.3 to 9.0, even in the conventional installations for anionic electrocoating.

The surface-coating binders of the invention can be diluted with conventional surface-coating solvents, e.g., isopropanol or decanol, or with aqueous organic solvents, and can then be applied — if appropriate together with pigments, fillers and the conventional assistants onto the substrate to be coated, e.g., metal or ceramic, after which they are dried and cured at above 170° C. The coatings thus obtained are distinguished by great hardness and resistance to solvents.

Preferably, however, the surface-coating binders are protonized with acids, e.g., phosphoric acid and its derivatives, or, preferably, with water-soluble carboxylic acids, e.g., acetic acid, formic acid or lactic acid. The protonized surface-coating binder can be diluted with water and be applied by conventional coating methods, again giving coatings having valuable properties. The degree of protonization should be kept as low as possible.

The preferred use of the protonized surface-coating binders is the cathodic electrocoating of electrically conductive surfaces, for example of metal articles, e.g., brass, copper, aluminum, iron or steel sheets, which may or may not have been chemically pretreated, e.g., phosphatized.

The aqueous solutions or dispersions of the surface-coating binders, which are at least partially in the form of salts with a water-soluble carboxylic or other acid, may in addition contain other assistants which can be cathodically deposited, e.g., other binders, pigments, fillers, stabilizers, curing catalysts or anti-foam agents.

To carry out the cathodic electrocoating, the bath is generally brought to a solids content of from 5 to 20% by weight of dilution with deionized water. Coating is generally carried out at from 15° to 40° C. for from 1 to 2 minutes at a pH of the bath of from 6.5 to 9.0, preferably from 7.0 to 8.5, and using a deposition voltage of from 50 to 500 volt. The film which has been cathodically deposited on the electrically conductive article is rinsed and then cured generally at from about 160° to 220° C. for from 10 to 30 minutes, preferably at from 170° to 200° C. for 20 minutes.

The crosslinking of the binder during baking essentially takes place via the o-alkanolaminomethylenephenol group; the o-dialkylaminomethylene-phenol group also participates to a lesser degree; in general, the blocked isocyanate groups contribute little to the crosslinking reaction. Instead, they trap amines liberated during baking, by nucleophilic exchange between the amine and the blocking agent. As a result, the blocking agent which causes substantially less pollution of the environment, i.e., preferably a lower aliphatic alcohol, is liberated. At the same time, the amine can to a lesser degree also attack the urethane bond between the polyisocyanate and the binder, in which case a diurea compound is split off; this is undesirable and is substantially avoided if attention is given to the different reactivity of the urethane groups of resin (B) and of the blocking agent.

The coating agents according to the invention possess particularly good throwing power and a lower deposition equivalent than prior art products and when applied to the substrates give coatings having good mechanical properties, in particular great hardness and scratch resistance coupled with good flexibility and firm adhesion. The coatings also exhibit great solvent resistance and particularly great resistance in the salt spray test.

In the Examples, parts and percentages are by weight.

Preparation of component A

A1: 130 parts of paraformaldehyde are added, under nitrogen, to 375 parts of bisphenol A, 260 parts of diethanolamine, 215 parts of di-n-butylamine, 200 parts of isopropanol and 406 parts of isobutanol. The batch is stirred for 30 minutes at 40° C. and then for 2.5 hours at 80° C. After adding 150 parts of a glycidyl ether of pentaerythritol, having an epoxy value of 0.6, and 375 parts of a glycidyl ether of bisphenol A, having an epoxy value of 0.2, the batch is reacted for a further 5 hours at 70° C. The solids content of the binder is 64.5%.

A2: 114 parts of paraformaldehyde are added, under nitrogen, to 312 parts of bisphenol A, 214 parts of a polyphenol, containing ether groups, prepared as described in Example 1 of German Laid-Open Application DOS No. 2,419,179 and having a solids content of 70%, 208 parts of diethanolamine, 90.5 parts of di-n-butylamine, 125 parts of di-n-hexylamine and 202 parts of i-butanol; the mixture is stirred for 30 minutes at 40° C. and then for 2.5 hours at 80° C. After adding 137 parts of a glycidyl ether of pentaerythritol (epoxy value 0.6), 315 parts of a glycidyl ether of bisphenol A (epoxy value 0.2) and 88 parts of isobutanol, the batch is kept at 70° C. for 5 hours. The solids content is 71%.

Preparation of component B

B1: 500 parts of a glycidyl ether of bisphenol A, having an epoxy value of 0.20, are heated to 90° C. in a reactor, 50 parts of toluene are then added, after which 80 parts of mercaptoethanol are added dropwise in the course of 1 hour at from 90° to 100° C. The temperature is maintained for 30 minutes, reduced pressure from a waterpump is then applied and the volatile constituents are stripped off in the course of 45 minutes, the final temperature being 100° C.

After dilution with 480 parts of methyl ethyl ketone, 548 parts of toluylene diisocyanate half blocked with cyclohexanol (prepared from 200 parts of cyclohexanol and 348 parts of toluylene diisocyanate at 90° C.) are slowly added dropwise at 90° C.

To complete the reaction of the isocyanate groups, the mixture is stirred for a further 2 hours at 90° C. The solids content is about 72%.

B2: 160 parts of mercaptoethanol are added in the course of one hour at 350 parts of a glycidyl ether of pentaerythritol, having an epoxy value of 0.6, and 50 parts of toluene at about 100° C. in a reactor, the mixture is stirred for a further 30 minutes and reduced pressure in then applied as described under 1.

200 parts of methyl ethyl ketone and 777 parts of halfblocked toluylene diisocyanate (of the same composition as in B1) are then added to the batch at 90° C. After stirring for a further 1.5 hours at 90° C., the batch is diluted with 224 parts of isopropanol. The solids content is about 76%.

EXAMPLE 1

259 parts of component A1 and 56 parts of component B1 are carefully homogenized, 2.8 parts of acetic acid are added and the mixture is slowly diluted, whilst stirring, to 2 liters, corresponding to about 10% solids content, by means of fully deionized water. The pH of the bath is 8.5. The bath is then stirred for 48 hours at 30° C.; the pH remains at 8.5.

A coating is deposited for 2 minutes at 30° C., under 250 volts, onto phosphatized steel sheet wired as the cathode; after curing for 20 minutes at 190° C., a smooth, hard coating which is from 12 to 13 μm thick and withstands flexing is obtained.

EXAMPLE 2

Using the method described in Example 1, 2 liters of electrocoating bath are prepared from 259 parts of component A2, 45 parts of component B2 and 3 parts of acetic acid, and are stirred thoroughly; pH 8.45.

A coating is deposited for 2 minutes at 30° C., under 360 volts, onto phosphatized steel sheet; after curing for 20 minutes at 190° C., a smooth, hard coating which is 12 μm thick and withstands flexing is obtained.

As in Example 1, the amine odor occurring on baking is less than when component A1 is used as the sole binder.

EXAMPLE 3

2 liters of electrocoating bath are prepared from 235 parts of component A2, 56 parts of component B1, 30 parts of i-butanol and 2.5 parts of acetic acid, as described in Example 1; pH 8.35.

After stirring the bath for 20 hours at 30° C., a coating is deposited on phosphatized steel sheet (2 minutes at 30° C., using 250 volts) and is cured (20 minutes at 190° C.); a flawless, slightly matt coating which is about 13 μm thick and withstands flexing is obtained.

EXAMPLE 4

2 liters of electrocoating bath are prepared from 235 parts of component A2, 45 parts of component B2 and 2.5 parts of acetic acid, as described in Example 1; pH 8.35.

After stirring the bath for 20 hours at 30° C., a coating is deposited on phosphatized steel sheet (2 minutes at 30° C., using 250 volts) and is cured (20 minutes at 190° C.); a flawless, glossy coating which is about 13 μm thick and withstands flexing is obtained.

The amine odor which occurs on baking is less than if component A2 is used as the sole binder.

We claim:

1. A surface-coating binder for the cathodic electrocoating of electrically conductive surfaces, comprising a protonized heat-curable reaction product (A), substantially free from epoxide groups, of
   (a) one or more Mannich bases, prepared from
       ($a_1$) one or more polyhydric condensed phenols which may or may not contain ether groups,
       ($a_2$) one or more secondary amines which contain one or more hydroxyalkyl groups, with or without one or more secondary amines which do not contain such groups and
       ($a_3$) formaldehyde or a formaldehyde donor, with
   (b) one or more epoxy resins,
   which binder also contains from 1 to 40% by weight, based on the total of (A) + (B), of a water-insoluble non-ionic resin (B), free from epoxide groups and containing urethane groups, which has been obtained by reacting a partially blocked diisocyanate or higher polyisocyanate with a reaction product of a polyepoxide and one or more low molecular weight compounds containing SH and/or OH groups.

2. A surface-coating binder as claimed in claim 1, wherein the non-ionic resin (B) which is free from epoxide groups and contains urethane groups is a reaction product of a partially blocked diisocyanate or higher polyisocyanate, which contains not more than one free isocyanate group per molecule, with a reaction product, which is substantially free from epoxide groups, of a polyepoxide with one or more compounds of the general formula HXR, where X is sulfur or oxygen and R is alkyl, oxaallkyl, hydroxyalkyl or hydroxyoxaalkyl of 2 to 10 carbon atoms, aryl or alkylphenyl.

3. A surface-coating binder as claimed in claim 2, wherein the polyepoxide used to prepare component (B) is a glycidyl ether based on bisphenol A, or of a polyhydric alcohol.

4. A surface-coating binder as claimed in claim 3, wherein the compound of the general formula HXR used to prepare component (B) is a mercaptan of the formula HSR, and R is alkyl of 1 to 12 carbon atoms, or is —CH₂—CH₂—OH or

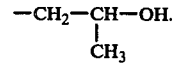

5. A surface-coating binder as claimed in claim 1, wherein the partially blocked diisocyanate or polyisocyanate used to prepare the non-ionic resin (B) which is free from epoxide groups and contains urethane groups is an aromatic diisocyanate which is partially blocked with an aliphatic or cycloaliphatic alcohol.

6. A surface-coating binder as claimed in claim 5, wherein the aliphatic alcohol used as the blocking agent is a secondary or tertiary alcohol.

* * * * *